US012658769B2

(12) United States Patent
Hung et al.

(10) Patent No.: US 12,658,769 B2
(45) Date of Patent: Jun. 16, 2026

(54) INVERTER AND ELECTRIC MOTOR WITH THE SAME

(71) Applicant: DELTA ELECTRONICS, INC., Taoyuan City (TW)

(72) Inventors: Hsien-Feng Hung, Taoyuan City (TW); Tzu-Ting Hsu, Taoyuan City (TW); Cheng-Yu Shen, Taoyuan City (TW); Yu-Lin Su, Taoyuan City (TW); Yi-Hsin Leu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 279 days.

(21) Appl. No.: 18/358,967

(22) Filed: Jul. 26, 2023

(65) Prior Publication Data

US 2024/0305170 A1 Sep. 12, 2024

(30) Foreign Application Priority Data

Mar. 7, 2023 (CN) .......................... 202310210245.6

(51) Int. Cl.
| | |
|---|---|
| *H02K 11/33* | (2016.01) |
| *H02K 5/20* | (2006.01) |
| *H02K 9/197* | (2006.01) |

(52) U.S. Cl.
CPC ............. *H02K 11/33* (2016.01); *H02K 5/203* (2021.01); *H02K 9/197* (2013.01)

(58) Field of Classification Search
CPC ......... H02K 11/33; H02K 5/203; H02K 9/197
USPC .............................................. 310/52, 58, 64
See application file for complete search history.

(56) References Cited

U.S. PATENT DOCUMENTS

| | | | |
|---|---|---|---|
| 6,031,751 A | 2/2000 | Janko | |
| 11,081,937 B2 | 8/2021 | Huang et al. | |
| 2010/0208427 A1* | 8/2010 | Horiuchi ............ | H05K 7/20927 |
| | | | 361/699 |
| 2014/0239755 A1 | 8/2014 | Nagao et al. | |
| 2021/0257883 A1 | 8/2021 | Kim et al. | |

FOREIGN PATENT DOCUMENTS

| | | | |
|---|---|---|---|
| CN | 106374680 A | 2/2017 | |
| CN | 106911224 A | 6/2017 | |
| CN | 114696546 A | 7/2022 | |
| EP | 3944476 A1 * | 1/2022 | ............. H02K 11/33 |
| JP | 2015073436 A * | 4/2015 | |

(Continued)

*Primary Examiner* — Jose A Gonzalez Quinones

(74) *Attorney, Agent, or Firm* — CKC & Partners Co., LLC

(57) ABSTRACT

An inverter includes an inverter case, a plurality of power modules and a plurality of cooling fins. The inverter case includes an annular portion, a supporting portion and a cooling liquid flow channel. The cooling liquid flow channel is a sealed channel located in the annular portion and the supporting portion, and a cooling liquid inlet and an inverter case cooling liquid flow channel outlet are formed on the annular portion at two ends of the cooling liquid flow channel. The power module is arranged on the supporting portion, and the cooling fins are arranged on the cooling liquid flow channel, the fin parts of the cooling fins are respectively extended and arranged inside the cooling liquid flow channel, and the contact parts of the cooling fins are respectively extended to contact heat transfer parts of corresponding power modules.

5 Claims, 7 Drawing Sheets

(56) References Cited

FOREIGN PATENT DOCUMENTS

| TW | 201911728 | A | 3/2019 | |
| TW | I737288 | B | 8/2021 | |
| TW | 202143608 | A | 11/2021 | |
| WO | 2011111617 | A1 | 9/2011 | |
| WO | WO-2013065472 | A1 * | 5/2013 | ........ H05K 7/14329 |
| WO | 2020057921 | A1 | 3/2020 | |
| WO | 2021136952 | A1 | 7/2021 | |

* cited by examiner

INVERTER AND ELECTRIC MOTOR WITH THE SAME

RELATED APPLICATIONS

This application claims priority to Chinese Patent Application Serial Number 202310210245.6, filed Mar. 7, 2023, the disclosures of which are incorporated herein by reference in their entireties.

TECHNICAL FIELD

The present disclosure relates to an inverter. More particularly, the present disclosure relates to an inverter of an electric motor.

BACKGROUND

With the advancement of science and technology in recent years, electric vehicles have become a priority industry in various countries. Electric vehicles generally use battery packs to provide power for the electric vehicles, and use inverter systems to convert direct current into alternating current with variable frequency and current to drive the electric motors of the electric vehicles. In different operating conditions, the inverter may be operated in a motor mode and a power generation mode. In the motor mode, the inverter outputs AC current to rotate the electric motor, while in the power generation mode, the electric motor uses the kinetic energy to convert the alternating current to the direct current so as to charge the battery pack to realize energy recovery.

The inverter is an important component of the powertrain system of the electric vehicle, and plays a key role in the electric vehicle powertrain system. The inverter converts the direct current (DC) power supplied from the battery pack into alternating current (AC) power to drive the electric motor of the electric vehicle, and controls the timing changes in the switching duty cycle to adjust the AC charging frequency to control the speed of the electric motor, just like fuel injection and ignition systems play a role in the internal combustion engine. A higher speed and efficiency of the inverter can improve the overall efficiency of the electric vehicle so as to increase the endurance mileage of the battery pack of the electric vehicle. The DC-AC conversion method is to control the switching sequence of each phase switch with the switching strategy, and uses frequency and current control command or torque control command to adjust the output of the converter so as to drive the electric motor to provide speed and torque. A higher frequency may provide a higher speed of the electric motor and a higher output current may provide a stronger torque of the electric motor so that a greater kinetic energy of the electric vehicle can be provided. Therefore, a better overall efficiency of the electric vehicle, a lower discharge speed of the battery pack and an increased endurance mileage may be obtained according to a better efficiency adjustment of the electric motor.

Generally speaking, the electric vehicle motor driving inverter will select the appropriate type of power switch element, such as Metal-Oxide-Semiconductor Field-Effect Transistor (MOSFET), Insulated Gate Bipolar Transistor (IGBT) or silicon carbide (SiC) power components, according to the operating voltage and switching frequency range. According to the voltage, current and temperature consideration, the power switching components are determined. In addition, an appropriate heat dissipation method has to be designed to reduce the heat generated by the power switching components while the electric motor driving inverter is working.

Hence, there is a need to integrate the inverter and the electric motor, and further improve the heat dissipation efficiency of the electric motor and the inverter in the field of electric vehicles.

SUMMARY

The summary of the present invention is intended to provide a simplified description of the disclosure to enable readers to have a basic understanding of the disclosure. The summary of the present invention is not a complete overview of the disclosure, and it is not intended to point out the importance of the embodiments/key elements of the present invention or define the scope of the invention.

One objective of the embodiments of the present invention is to provide an electric motor able to simplify the assembly structure of the inverter and the motor main body, reduce the overall weight of the electric motor, and integrate the cooling liquid flow channel of the inverter and the motor so as to improve the working efficiency and service life of the electric motor.

To achieve these and other advantages and in accordance with the objective of the embodiments of the present invention, as the embodiment broadly describes herein, the embodiments of the present invention provides an inverter including an inverter case, a plurality of power modules and a plurality of cooling fins. The inverter case includes an annular portion having a hollow structure axially penetrating up and down, a supporting portion arranged in the hollow structure of the annular portion and a cooling liquid flow channel. In addition, the cooling liquid flow channel is a sealed channel located in the annular portion and the supporting portion, and a cooling liquid inlet and an inverter case cooling liquid flow channel outlet are respectively formed at two ends of the cooling liquid flow channel. Each power module includes a heat transfer part and a plurality of cooling fins, and each cooling fin respectively includes a fin part and a contact part. The power modules are arranged on the supporting portion, and the cooling fins are arranged in the cooling liquid flow channel, the fin part of the cooling fin is respectively extended and arranged in the cooling liquid flow channel, and the contact part of the cooling fin is respectively extended to contact a heat transfer part of a corresponding power module of the power modules.

In some embodiments, the inverter further includes a capacitor module, a DC bus bar and a plurality of AC bus bars. The power modules include a plurality of AC output terminals, a plurality of DC input terminals and a plurality of signal terminals, the AC output terminals of the power modules are respectively connected to corresponding AC bus bars, the power modules and corresponding DC input terminals are annularly arranged around the capacitor module, and the DC bus bar is extended to electrically connect to the corresponding DC input terminals and electrically connect to the capacitor module so that the power modules are respectively connected in parallel with the capacitor module.

In some embodiments, the supporting portion of the inverter case further includes an accommodating area and the capacitor module is accommodated in the accommodating area.

In some embodiments, the cooling liquid flow channel extends to corresponding locations of the power modules.

In some embodiments, the cooling liquid flow channel further surrounds the accommodating area, and an area of the cooling liquid flow channel corresponding to the accommodating area is formed by a good heat conductor.

In some embodiments, the power modules are arranged on a supporting portion top surface of the supporting portion, and the supporting portion further includes a plurality of passageways penetrating through the supporting portion up and down, and the AC bus bars are extended downward through the passageways.

According to another aspect of the present invention, an electric motor is provided. The electric motor includes a motor main body, an inverter case, a plurality of power modules and a plurality of cooling fins. The motor main body includes a motor housing. The inverter case includes an annular portion, a supporting portion and a cooling liquid flow channel. The annular portion has a hollow structure axially penetrating up and down, and the supporting portion is arranged in the hollow structure of the annular portion. In addition, the cooling liquid flow channel is a sealed channel located in the annular portion and the supporting portion, and a cooling liquid inlet and an inverter case cooling liquid flow channel outlet are respectively formed at two ends of the cooling liquid flow channel. Each power module includes a heat transfer part and a plurality of cooling fins. Each cooling fin respectively includes a fin part and a contact part. In addition, the inverter is axially stacked on the motor main body, the inverter case is arranged on a motor housing top end of the motor housing, the power modules are arranged on the supporting portion, and the cooling fins are arranged in the cooling liquid flow channel. The fin part of the each of the cooling fins is respectively extended and arranged in the cooling liquid flow channel, and the contact part of the each of the cooling fins is respectively extended to contact a heat transfer part of a corresponding power module of the power modules.

In some embodiments, the inverter further includes a plurality of AC bus bars, and each of the AC bus bars respectively includes an extended AC bus bar. In addition, the power modules include a plurality of AC output terminals, a plurality of DC input terminals and a plurality of signal terminals, and the motor main body further includes a motor coil. Furthermore, one end of each of the AC bus bars is respectively electrically connected to a corresponding AC output terminal of the AC output terminals, and another end of the each of the AC bus bars is electrically connect to a corresponding extended AC bus bar, and the corresponding extended AC bus bar is downward extended to electrically connect to the motor coil, and the extended AC bus bar is upward extended and mechanically connected to a corresponding AC bus of the AC bus bars so as to electrically connect together.

In some embodiments, the power modules are arranged on a supporting portion top surface of the supporting portion, the supporting portion further includes a plurality of passageways penetrating through the supporting portion up and down, the extended AC bus bars are upward extended to pass through the passageways, and the extended AC bus bars and the AC bus bars are mechanically connected together above the supporting portion.

In some embodiments, the motor housing top end is correspondingly connected to an inverter case bottom end of the inverter case, the motor housing top end includes a cooling liquid outlet, and the cooling liquid flow channel is a sealed channel communicated in the annular portion, the supporting portion and the motor housing. In addition, the motor housing further includes a motor housing cooling liquid flow channel inlet correspondingly sealed to the inverter case cooling liquid flow channel outlet.

In some embodiments, the cooling liquid flow channel further includes a cooling liquid entering path, at least one cooling liquid circulation path and a cooling liquid exhausting path. The cooling liquid entering path, the cooling liquid circulation path and the cooling liquid exhausting path are communicated together in sequence and formed in the motor housing, the motor housing cooling liquid flow channel inlet is communication with the cooling liquid entering path, and the cooling liquid exhausting path is communication with the cooling liquid outlet.

In some embodiments, the electric motor further includes a plurality of cooling liquid circulation paths, the cooling liquid circulation paths surround in the motor housing in parallel, two ends of the cooling liquid circulation paths are respectively communicated with the cooling liquid entering path and the cooling liquid exhausting path, and the cooling liquid entering path and the cooling liquid exhausting path are adjacent to each other and separated on two sides of a cooling liquid inlet guide plate. In addition, a cooling liquid of the cooling liquid flow channel flows through the inverter case, the power modules and the motor housing in sequence.

In some embodiments, the inverter case is detachably arranged and mechanically connected to the motor housing top end.

In some embodiments, the inverter further includes a capacitor module and the power modules includes a plurality of AC output terminals, a plurality of DC input terminals and a plurality of signal terminals, wherein the AC output terminals of the power modules are respectively connected to corresponding AC bus bars, the power modules and corresponding DC input terminals are annularly arranged around the capacitor module, and the DC bus bar is extended to electrically connect to the corresponding DC input terminals and is electrically connect to the capacitor module so that the power modules are respectively connected in parallel with the capacitor module.

In some embodiments, the supporting portion of the inverter case further includes an accommodating area and the capacitor module is accommodated in the accommodating area.

In some embodiments, the cooling liquid flow channel extends to corresponding locations of the power modules.

In some embodiments, the cooling liquid flow channel further surrounds the accommodating area, and an area of the cooling liquid flow channel corresponding to the accommodating area is formed by a good heat conductor.

In some embodiments, the power modules are arranged on a supporting portion top surface of the supporting portion, and the supporting portion further includes a plurality of passageways penetrating through the supporting portion up and down, and the AC bus bars are extended downward through the passageways.

Hence, the inverter may effectively cool the power modules and the capacitor module with the cooling liquid flow channel in the inverter case, simplify the circuit layout and reduce the influence of heat generated by the power modules and the AC output terminals on the electronic components of the circuit board with the two-phase power modules and the AC output terminals annularly arranged on a periphery of the circuit board. In addition, the motor main body and the inverter share the same cooling liquid, and the inverter cooling liquid outlet and the cooling liquid inlet of the motor main body are tightly sealed together to reduce the structure complexity of the electric motor. Furthermore, the cooling liquid flow channel of the motor housing is formed in a C-shaped path so that the resistance force is reduced and the cooling liquid may conveniently flow through. Hence, the electric motor has an inverter and a motor main body axially stacked with the inverter so as to reduce the distance extending from the motor coil to the inverter, reduce the entire volume of the whole inverter, simplify the assembly structure of the inverter and the motor main body, and therefore reduce the overall weight of the electric motor.

BRIEF DESCRIPTION OF THE DRAWINGS

The disclosure can be more fully understood by reading the following detailed description of the embodiment, with reference made to the accompanying drawings as follows.

DETAILED DESCRIPTION OF THE PREFERRED EMBODIMENT

Figure 1:
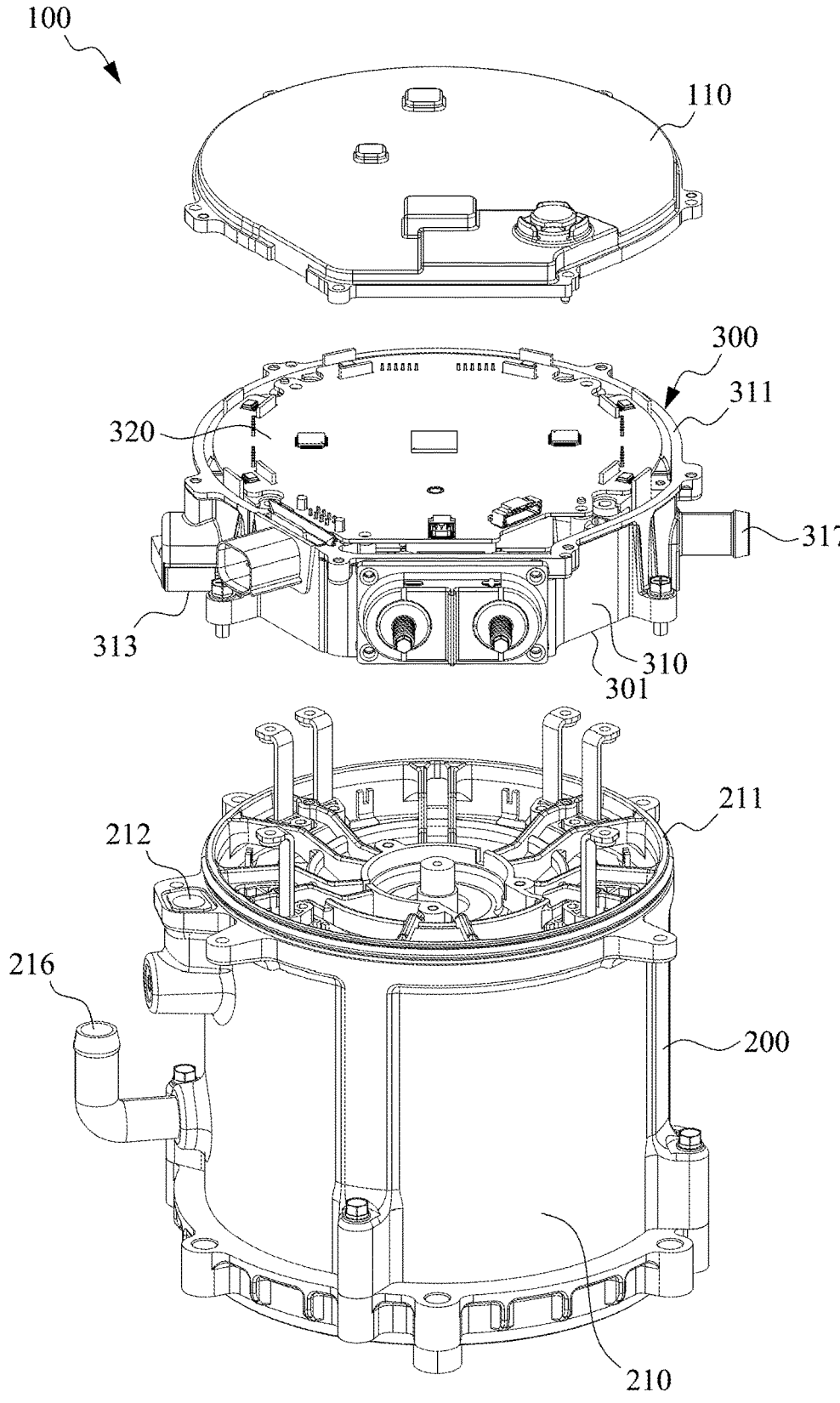
FIG. 1 illustrates an exploded schematic diagram showing an electric motor according to one embodiment of the present invention.

The following is a detailed description of the embodiments in conjunction with the accompanying drawings, but the provided embodiments are not intended to limit the scope of the disclosure, and the description of the structure and operation is not used to limit the execution sequence thereof. The structure of the recombination of components and the resulting devices with equal functions are all within the scope of this disclosure. In addition, the drawings are for illustration purposes only, and are not drawn according to the original scale. For ease of understanding, the same reference numbers are used in the drawings and the description to refer to the same or like parts.

In addition, the terms used in the entire description and the scope of the patent application, unless otherwise specified, usually have the usual meaning of each term used in this field, in the content disclosed here and in the special content. Some terms used to describe the disclosure are discussed below or elsewhere in this specification to provide additional guidance to those skilled in the art in the disclosure.

In the implementation mode and the scope of the present application, unless the article is specifically limited in the context, "a" and "the" can generally refer to a single or pluralities. In the steps, the numbering is only used to conveniently describe the steps, rather than to limit the sequence and implementation.

Secondly, the words "comprising", "including", "having", "containing" and the like used in the present application are all open language, meaning including but not limited to.

Figure 2:
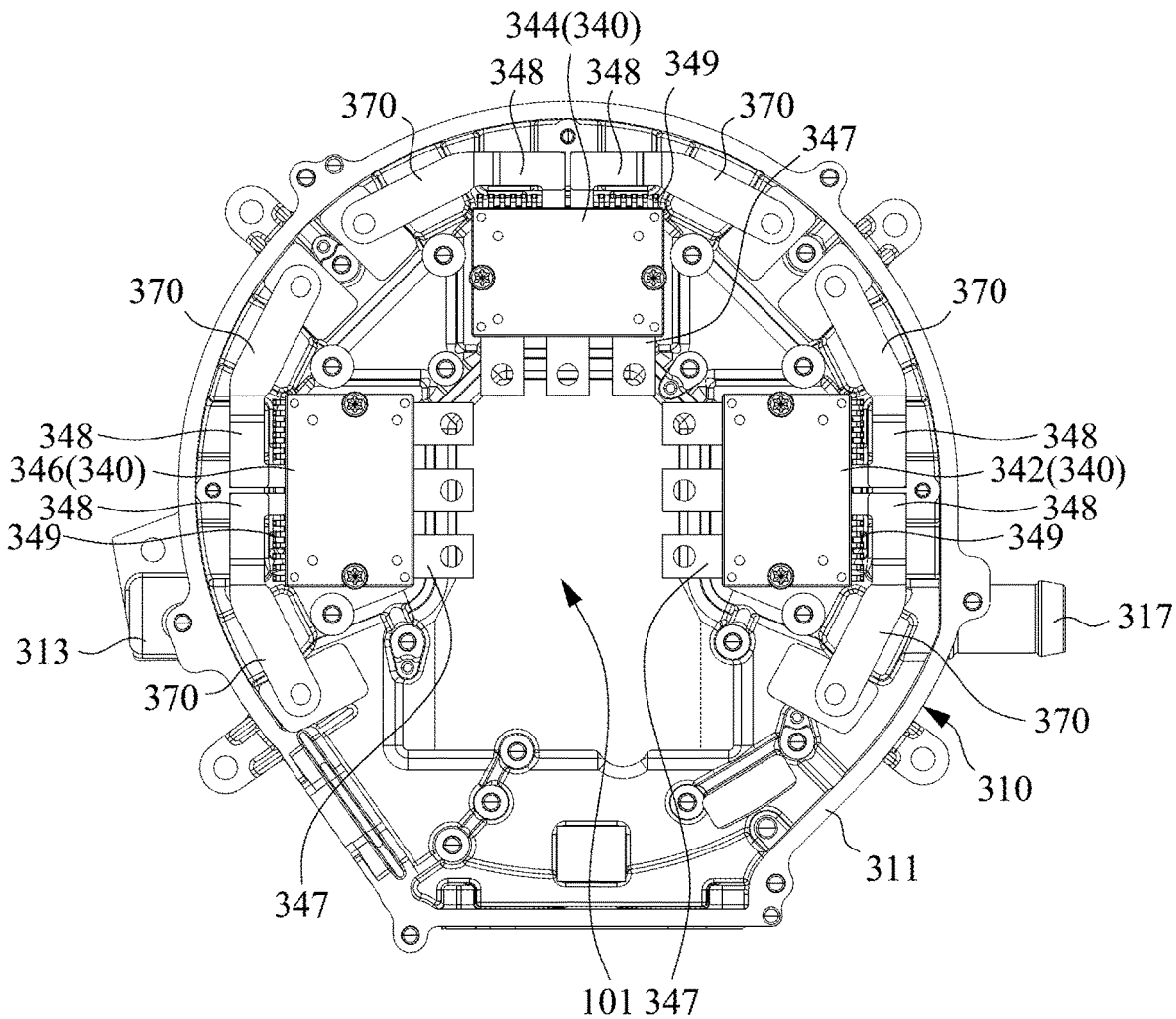
FIG. 2 illustrates a schematic diagram showing power modules and AC output terminals of the inverter of the electric motor of FIG. 1.
Figure 3:
FIG. 3 illustrates a schematic diagram showing the cooling liquid flow direction of the electric motor of FIG. 1.
Figure 4:
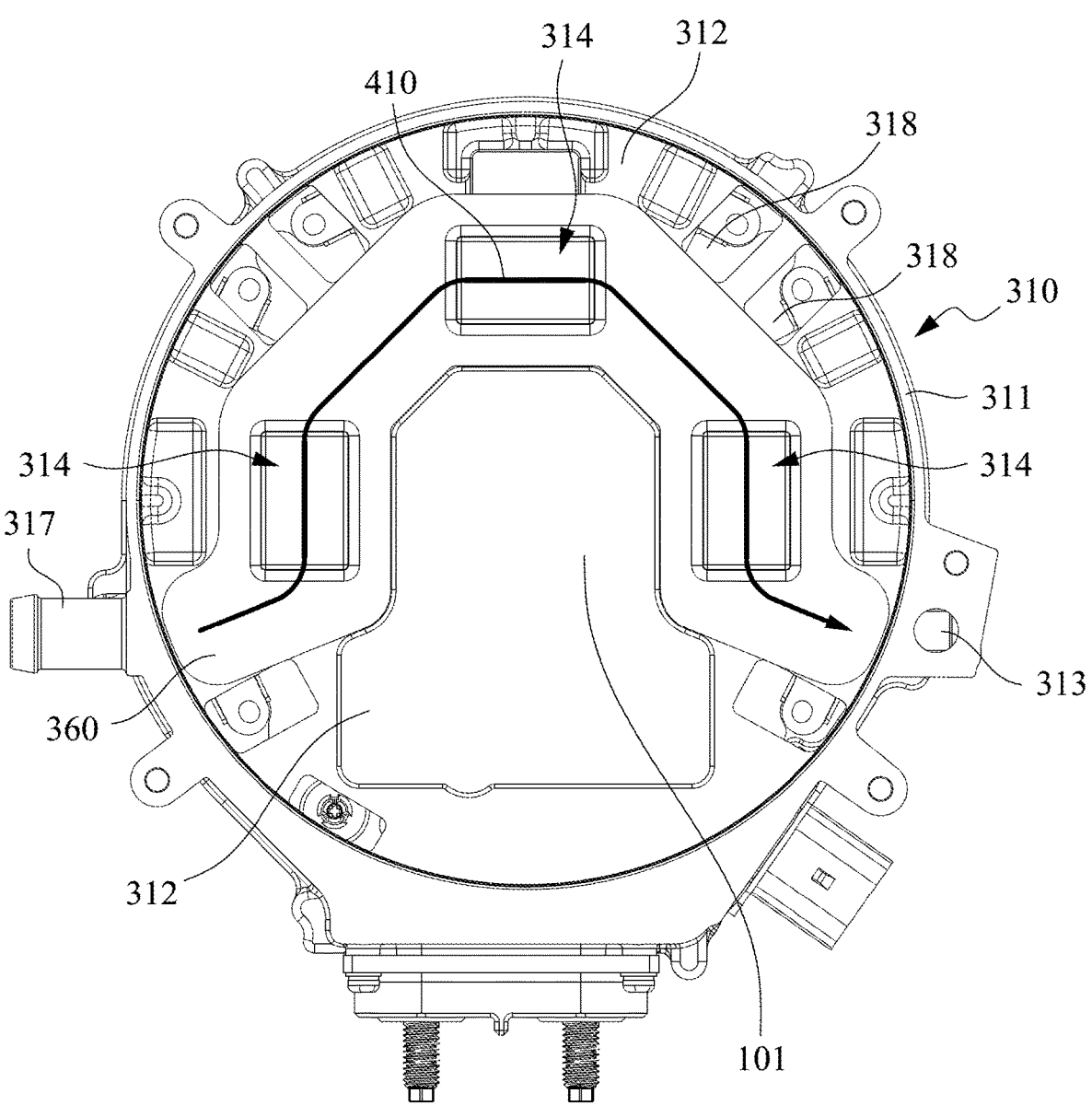
FIG. 4 illustrates a schematic bottom view showing an inverter cooling liquid flow channel of the inverter of the electric motor of FIG. 1.
Figure 5:
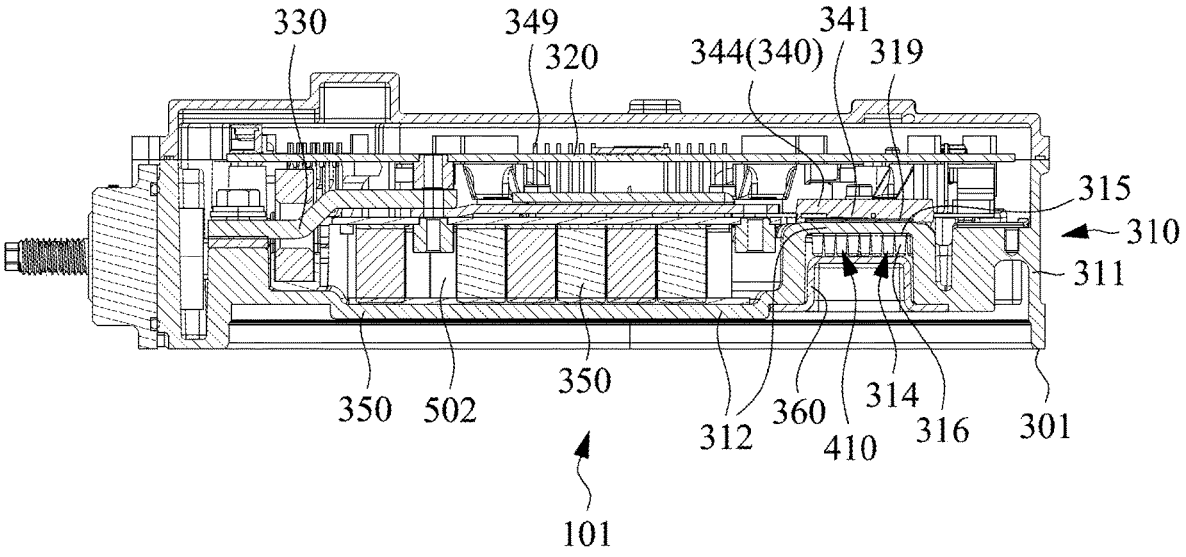
FIG. 5 illustrates a schematic cross-sectional view showing the inverter cooling liquid flow channel of the inverter of the electric motor of FIG. 1.
Figure 6:
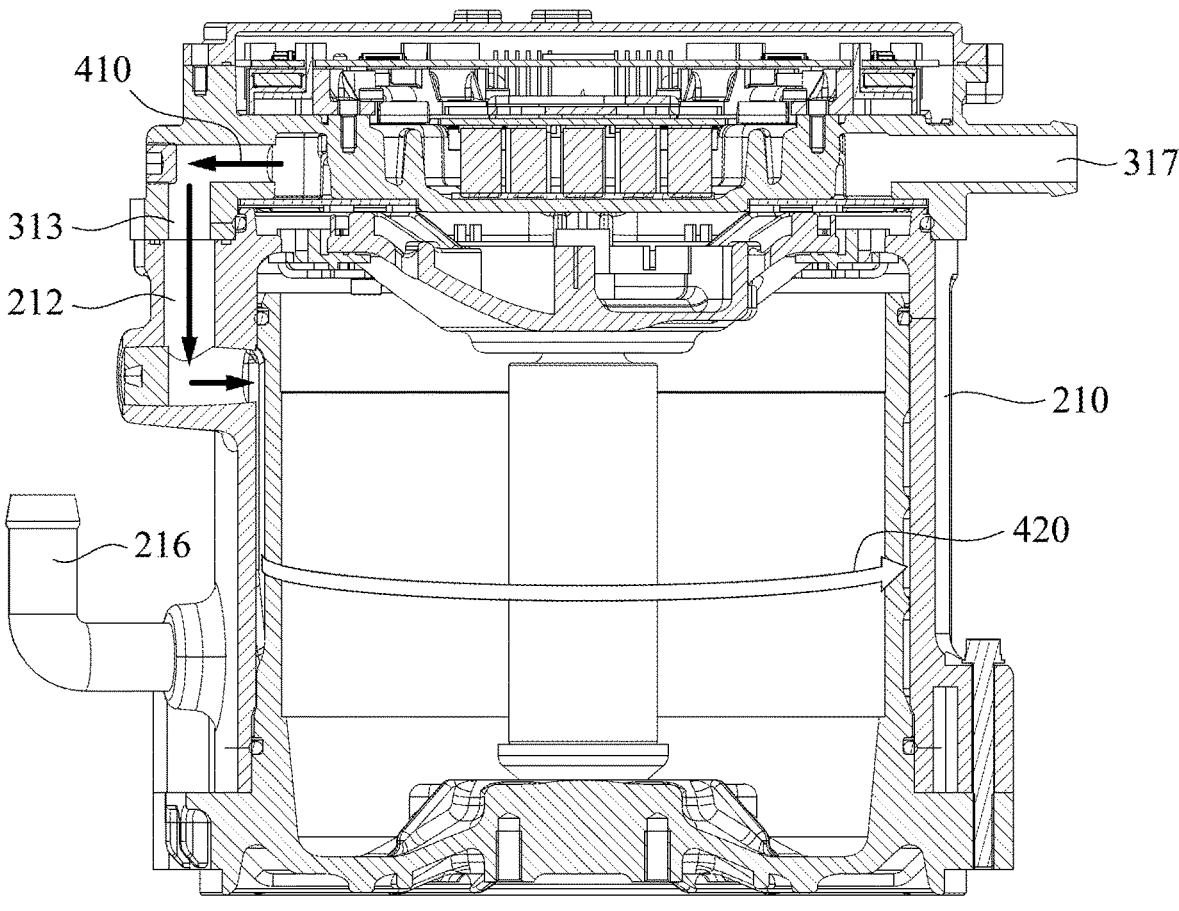
FIG. 6 illustrates a schematic side view showing the inverter cooling liquid flow channel of the inverter of the electric motor of FIG. 1.
Figure 7:
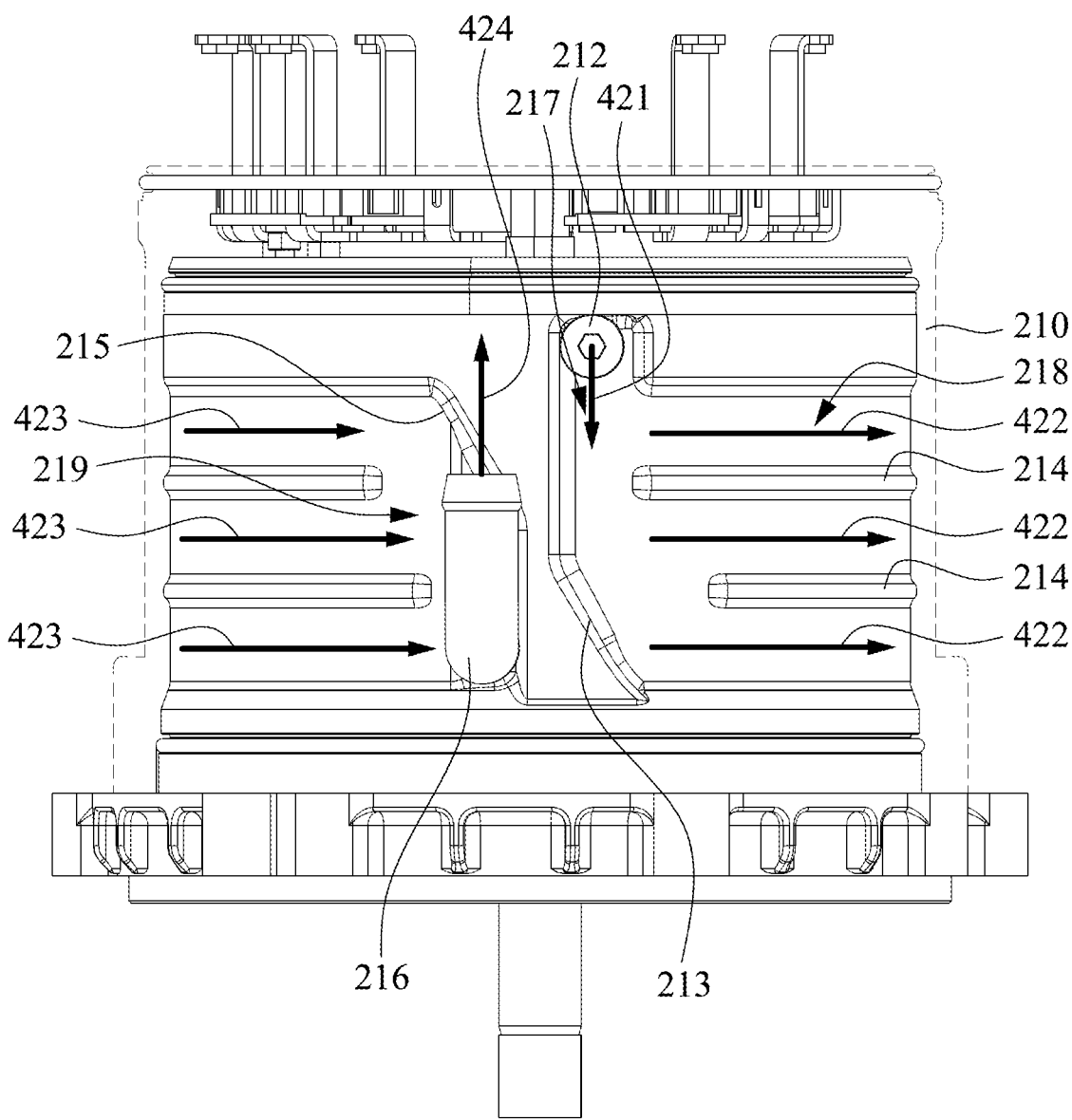
FIG. 7 illustrates a schematic diagram showing the motor main body cooling liquid flow channel of the motor main body of the electric motor of FIG. 1.

FIG. 1 illustrates an exploded schematic diagram showing an electric motor according to one embodiment of the present invention, FIG. 2 illustrates power modules and AC output terminals of the inverter of the electric motor, FIG. 3 illustrates the cooling liquid flow direction of the electric motor, FIG. 4 illustrates an inverter cooling liquid flow channel of the inverter of the electric motor, FIG. 5 illustrates the inverter cooling liquid flow channel of the inverter of the electric motor, FIG. 6 illustrates the inverter cooling liquid flow channel of the inverter of the electric motor, and FIG. 7 illustrates the motor main body cooling liquid flow channel of the motor main body of the electric motor.

Referring to FIG. 1, as shown in the drawing, the electric motor 100 includes a motor main body 200 and an inverter 300. The inverter 300 is axially stacked on one end of the motor main body 200.

In addition, the inverter case 310 is designed in a disk shape and directly axially connected to the motor housing 210 to eliminate an additional housing structure for supporting the inverter 300 so as to reduce the whole weight of the electric motor 100. The top side of the inverter case 310 is sealed by an upper cover 110, and the bottom side of the inverter case 310 is sealed to the motor housing 210 of the motor main body 200.

Also referring to FIG. 2, the configuration of a plurality of power modules 340 and AC output terminals 348 of the inverter 300 is illustrated. The circuit board 320 is removed therefrom in order to illustrate the power modules 340 and the AC output terminals 348 under the circuit board 320. As shown in FIGS. 1, 2 and 3, the inverter 300 includes an inverter case 310, a plurality of power modules 340 and a plurality of cooling fins 314. The inverter case 310 includes an annular portion 311, a supporting portion 312 and a cooling liquid flow channel 400. The annular portion 311 includes a hollow structure axially penetrating up and down, the supporting portion 312 is arranged in the hollow structure of the annular portion 311, and the cooling liquid flow channel 400 is a sealed channel located and communicated in the annular portion 311 and the supporting portion 312. In addition, a cooling liquid inlet 317 and an inverter case cooling liquid flow channel outlet 313 are respectively formed at two ends of the cooling liquid flow channel 400 of the annular portion 311.

The power modules 340 and the AC output terminals 348 are arranged along the inner edge of the annular portion 311 of the inverter case 310, and the power modules 340 is fixed on the circuit board 320, that is to say, the power modules 340 and the AC output terminals 348 are arranged annularly on a periphery of the circuit board 320, and the AC output terminals 348 are located between the power modules 340 and the inverter case 310.

Each of the power modules 340 respectively includes a heat transfer part 341 and a plurality of cooling fins 314. The cooling fin 314 further includes a fin part 316 and a contact part 315. The power modules 340 is arranged on the supporting portion 312, and the cooling fins 314 are arranged in the cooling liquid flow channel 400, the fin part 316 of each cooling fin 314 is respectively extended and arranged inside the cooling liquid flow channel 400, and the contact part 315 of each cooling fin 314 is respectively extended to contact a heat transfer part 341 of a corresponding power module 340.

In some embodiments, simultaneously referring to FIG. 5, the inverter 300 further includes a capacitor module 350, a DC bus bar 330 and a plurality of AC bus bars 370, also referring to FIG. 2. In addition, the power modules 340 include a plurality of AC output terminals 348, a plurality of DC input terminals 347 and a plurality of signal terminals 349, and the AC output terminals 348 of the power modules 340 are respectively connect to the corresponding AC bus bars 370, the power modules 340 and corresponding DC input terminals 347 thereof are annularly arranged around the capacitor module 350, and the DC bus bar 330 is extended to electrically connect to corresponding DC input terminals 347 and also electrically connect the capacitor module 350 so that the power modules 340 are respectively connected in parallel with the capacitor module 350.

In some embodiments, the capacitor module 350 includes one capacitor or a plurality of capacitors, preferably arranged in a central area 101 surrounded by the power modules 340, so that the distances between the capacitor module 350 and the power modules 340 may more uniform. In addition, the capacitor module 350 may be arranged closer to the power modules 340 so as to effectively improve the working efficiency of the capacitor module 350.

In some embodiments, as illustrated in the cross-sectional view of the inverter cooling liquid flow channel of FIG. 5, the supporting portion 312 of the inverter case 310 further includes an accommodating area 502 formed above the supporting portion 312, and the capacitor module 350 is accommodated in the accommodating area 502.

In some embodiments, the power modules 340, the DC bus bar 330 and the capacitor module 350 are located under the circuit board 320, and the signal terminals 349 of the power modules 340 are electrically connected to the circuit board 320, and further electrically connected to the gate driver and the control circuit.

In some embodiments, the cooling liquid flow channel 400 is extended to the positions corresponding to the power modules 340. Preferably, the cooling liquid flow channel 400 surrounds the accommodating area 502, and the area of the cooling liquid flow channel 400 corresponding to the accommodating area 502 is formed by a good heat conductor, e.g. aluminum alloy, zinc alloy or magnesium alloy or the like.

In some embodiments, the power modules 340 is arranged on the supporting portion top surface 319. In addition, referring to FIG. 3, the supporting portion 312 further includes a plurality of passageways 318 penetrating through the supporting portion 312 up and down, and the AC bus bars 370 are extended downward through the passageways 318.

In some embodiments, the AC bus bars 370 includes an extended AC bus bars 372, and the motor main body 200 includes a motor coil. One end of each AC bus bar 370 is respectively connected to a corresponding AC output terminal 348 and another end of the AC bus bar 370 is connected to a corresponding extended AC bus bars 372, and the extended AC bus bar 372 is extended to electrically connect to the motor coil, and the extended AC bus bar 372 is upward extended to the corresponding AC bus bars 370 and the extended AC bus bar 372 is mechanically connected to the corresponding AC bus bar 370 with a fastening device, such as a screw, welding or the like, without departing from the spirit and protection scope of the present invention.

In some embodiments, the extended AC bus bars 372 may be extended upward through the passageways 318, and the extended AC bus bars 372 and the AC bus bars 370 are mechanically connected together at positions above the supporting portion 312 with fastening devices, such as screws, welding or the like, without departing from the spirit and protection scope of the present invention.

In some embodiments, the power modules 340 include, for example, a first two-phase power module 342, a second two-phase power module 344 and a third two-phase power module 346, and the AC output terminals 348 are arranged annularly on a periphery of the circuit board 320 and the power modules 340 are arranged on an inner side of the AC output terminals 348.

The first two-phase power module 342, the second two-phase power module 344 and the third two-phase power module 346 arranged annularly on the periphery of the circuit board 320 may reduce the influence of heat generated by the power modules 340 and the AC output terminals 348 on the electronic components of the circuit board 320.

In addition, the annular arrangement of the AC output terminals 348 of the power modules 340 is more helpful to dissipate the heat of the inverter 300, and may effectively reduce the length differences of the control signal paths therebetween so as to uniform the signal noise and conveniently eliminate the noise interference generated by the inverter 300.

In addition, the annular arrangement of the two-phase power modules on the periphery of the circuit board 320 may further simplify the circuit layout of the inverter 300 as well as simplify the components and structure of the inverter 300 and the electric motor 100.

Therefore, the DC power of the battery pack is converted from the DC power into the AC power by the power modules 340, and then outputted by way of the AC output terminals 348.

When converting direct current into alternating current, a large amount of heat will be generated by the power modules 340, and excessive temperature may therefore affect the working efficiency and service life of the inverter 300. In addition, when the electric motor 100 is operating, the rotating rotor and the variating magnetic field may also generate heat. During a long time high temperature operation, the high temperature may affect the insulation performance inside the electric motor and the service life of the bearings. Therefore, there is a need to reduce the operating temperature of the inverter 300 and the motor main body 200 when the electric motor 100 is working, so as to improve the working efficiency and the service life of the inverter 300 and the electric motor 100.

Simultaneously referring to FIGS. 3 to 7, the cooling liquid flow channel 400 of the electric motor 100 is illustrated. In FIG. 3, the cooling liquid of the electric motor 100 enters into the inverter 300 from the cooling liquid inlet 317 along the arrow direction 401, and then passes under the of the first two-phase power module 342 along the arrow direction 402. Subsequently, the cooling liquid passes under the second two-phase power module 344 along the arrow direction 403, and then the cooling liquid passes under the third two-phase power module 346 along the arrow direction 404 to effectively cool down the first two-phase power module 342, the second two-phase power module 344 and the third two-phase power module 346.

In addition, the cooling liquid is discharged from the inverter case 310 through the inverter case cooling liquid flow channel outlet 313 along the arrow direction 405. Meanwhile, because that the inverter case cooling liquid flow channel outlet 313 and the motor housing cooling liquid flow channel inlet 212 are sealed together, the cooling liquid discharged from the inverter case 310 may directly enter into the motor housing 210 through the motor housing cooling liquid flow channel inlet 212 along the arrow direction 406.

Furthermore, the cooling liquid circulates the motor housing 210 about one circuit along the arrow direction 407, and is discharged from the motor housing 210 through the cooling liquid outlet 216 as well as be discharged from the electric motor 100.

Therefore, the electric motor 100 adopts a single flow cooling system, so that the cooling liquid enters into the electric motor 100 from the inverter 300 to cool the power modules 340 and other electronic components in the inverter 300, then flows into the motor main body 200 to cool the components in the motor main body 200. The inverter 300 and the motor main body 200 share a common liquid cooling system to effectively improve the working efficiency of the entire electric motor 100 and further improve the service life of the electric motor 100.

Referring to FIGS. 4 and 5, as shown in the drawings, the inverter cooling liquid flow channel 410 of the cooling liquid flow channel 400 starts from the cooling liquid inlet 317 and ends at the inverter case cooling liquid flow channel outlet 313. The inverter cooling liquid flow channel 410 sequentially passes through the bottom sides of the power modules 340. In addition, in the flow channel of the inverter case 310, the bottom sides of the power modules 340 are further equipped with a plurality of cooling fins 314 having the of the fin parts 316 extending into the cooling liquid flow channel 400 and the contact parts 315 respectively contacting heat transfer parts 341 of corresponding power modules 340 to enhance the cooling efficiency of the power modules 340.

In some embodiments, the motor housing 210 is formed by a good heat conductor.

In some embodiments, the inverter case 310 and the motor housing 210 are formed by aluminum alloy, zinc alloy, magnesium alloy or the like.

In some embodiments, the inverter case 310 and the motor housing 210 are preferably metal casings manufactured by metal processing, die casting or powder metallurgy.

In some embodiments, the cooling fins 314 and the inverter case 310 are integrally formed in one piece, or the cooling fins 314 and the inverter case 310 are formed separately and the cooling fins 314 are then fixed in the inverter case 310, without departing from the spirit and protection scope of the present invention.

In some embodiments, the cooling fins 314 are pin type cooling fins.

In some embodiments, the inverter 300 further includes a cooling liquid flow channel sealing cover 360 to seal the inverter case 310 so as to allow the cooling liquid flowing in the inverter cooling liquid flow channel 410 and passing through the cooling fins 314. In addition, the cooling liquid flow channel sealing cover 360 is formed by metal or plastic, without departing from the spirit and protection scope of the present invention.

Referring to FIGS. 6 and 7, the motor main body cooling liquid flow channel 420 of the motor main body of the electric motor is illustrated. As shown in the drawings, the cooling liquid enters from the cooling liquid inlet 317, passes through the power modules 340, the capacitor module 350 and electronic components by way of the inverter cooling liquid flow channel 410, exits the inverter case 310 by way of the inverter case cooling liquid flow channel outlet 313, and then directly enters the motor housing cooling liquid flow channel inlet 212.

In some embodiments, the motor main body cooling liquid flow channel 420 of the cooling liquid flow channel 400 in the motor housing 210 includes a cooling liquid entering path 217, at least one cooling liquid circulation path 218 and a cooling liquid exhausting path 219. The cooling liquid entering path 217, the cooling liquid circulation path 218 and the cooling liquid exhausting path 219 are formed in the motor housing 210 in sequence. The motor housing cooling liquid flow channel inlet 212 is communication with the cooling liquid entering path 217, and the cooling liquid exhausting path 219 is communication with the cooling liquid outlet 216.

Hence, the cooling liquid may circulate the motor housing 210 along the motor main body cooling liquid flow channel 420 and exit the motor housing 210 from the cooling liquid outlet 216.

Particularly referring to FIG. 7, as shown in the drawing, the motor main body cooling liquid flow channel 420 starts from motor housing cooling liquid flow channel inlet 212, and ends at the cooling liquid outlet 216. When the cooling liquid enters the motor housing 210 from the motor housing cooling liquid flow channel inlet 212, the cooling liquid is guided by the cooling liquid inlet guide plate 213 to enter the cooling liquid entering path 217 and flow downward along the arrow direction 421, and then guided by the cooling liquid circulation paths 218, i.e. horizontal cooling liquid paths, formed by a plurality of cooling liquid horizontal guide plates 214 along the arrow direction 422 to the right side of FIG. 7. The cooling liquid may circulate in the motor housing 210 at least in a C-shaped circulation to reach the cooling liquid outlet 216 along the arrow direction 423, and the cooling liquid exhausting path 219 formed by the cooling liquid outlet guide plate 215 may form a discharge path to guide the cooling liquid to the cooling liquid outlet 216, and exits the motor housing 210 along the arrow direction 424.

In some embodiments, the motor main body cooling liquid flow channel 420 includes a plurality of cooling liquid circulation paths 218 parallel with each other to circulate in the motor housing 210, and two ends of the cooling liquid circulation paths 218 are respectively communicated with the cooling liquid entering path 217 and the cooling liquid exhausting path 219. It is worth noting that the cooling liquid entering path 217 is adjacent to the cooling liquid exhausting path 219, and the cooling liquid entering path 217 and the cooling liquid exhausting path 219 are separated on two sides of the cooling liquid inlet guide plate 213 and/or the cooling liquid outlet guide plate 215 to guide the cooling liquid to circulate in the motor housing 210 with a C-shaped circulation along the arrow direction 422, and then discharge from the motor housing 210.

In some embodiments, the inverter case 310 is detachably coupled to the motor housing top end 211 with a mechanical connection. In addition, the motor housing top end 211 is corresponding to the inverter case bottom end 301 of the inverter case 310.

In some embodiments, the circuit board 320 is a driving circuit such as an integral circuit board having a gate driver and a control circuit so as to effectively simplify the assembly structure of the inverter 300, thereby improving the manufacturing efficiency of the inverter 300 and the electric motor 100.

In some embodiments, the motor housing 210 of the motor main body 200 and the inverter case 310 of the inverter 300 are made of metal materials to improve the heat dissipation efficiency and the mechanical strength of the inverter 300 and the electric motor 100.

Accordingly, the inverter may effectively cool the power modules and the capacitor module with the cooling liquid flow channel in the inverter case, simplify the circuit layout and reduce the influence of heat generated by the power modules and the AC output terminals on the electronic components of the circuit board with the two-phase power modules and the AC output terminals annularly arranged on a periphery of the circuit board. In addition, the motor main body and the inverter share the same cooling liquid, and the inverter cooling liquid outlet and the cooling liquid inlet of the motor main body are tightly sealed together to reduce the structure complexity of the electric motor. Furthermore, the cooling liquid flow channel of the motor housing is formed in a C-shaped path so that the resistance force is reduced and the cooling liquid may conveniently flow through. Hence, the electric motor has an inverter and a motor main body axially stacked together so as to reduce the distance extending from the motor coil to the inverter, reduce the entire volume of the whole inverter, simplify the assembly structure of the inverter and the motor main body, and therefore reduce the overall weight of the electric motor.

What is claimed is:

1. An inverter, comprising:
an inverter case, comprising:
an annular portion having a hollow structure axially penetrating up and down;
a supporting portion arranged in the hollow structure of the annular portion; and
a cooling liquid flow channel, wherein the cooling liquid flow channel is a sealed channel located in the annular portion and the supporting portion, and a cooling liquid inlet and an inverter case cooling liquid flow channel outlet are respectively formed at two ends of the cooling liquid flow channel;
a plurality of power modules, each of the power modules comprising a heat transfer part;
a plurality of cooling fins, each of the cooling fins respectively comprising a fin part and a contact part;
a plurality of AC bus bars respectively connecting to corresponding ones of the power modules; and
a plurality of extended AC bus bars,
wherein the power modules are arranged on the supporting portion, and the cooling fins are arranged in the cooling liquid flow channel, the fin part of the each of the cooling fins is respectively extended and arranged in the cooling liquid flow channel, and the contact part of the each of the cooling fins is respectively extended to contact a heat transfer part of a corresponding power module of the power modules,
wherein the power modules are arranged on a supporting portion top surface of the supporting portion, and the supporting portion further comprises a plurality of passageways penetrating through the supporting portion up and down, and the extended AC bus bars are extended downward through the passageways, and the extended AC bus bars are respectively and mechanically connected to corresponding ones of the AC bus bars above the supporting portion with screws or welding.

2. The inverter of claim 1, wherein the inverter further comprises:
a capacitor module;
a DC bus bar; and
a plurality of AC bus bars, wherein the power modules comprise a plurality of AC output terminals, a plurality of DC input terminals and a plurality of signal terminals, the AC output terminals of the power modules are respectively connected to corresponding AC bus bars, the power modules and corresponding DC input terminals are annularly arranged around the capacitor module, and the DC bus bar is extended to electrically connect to the corresponding DC input terminals and electrically connect to the capacitor module so that the power modules are respectively connected in parallel with the capacitor module.

3. The inverter of claim 2, wherein the supporting portion of the inverter case further comprises an accommodating area and the capacitor module is accommodated in the accommodating area.

4. The inverter of claim 3, wherein the cooling liquid flow channel extends to corresponding locations of the power modules.

5. The inverter of claim 4, wherein the cooling liquid flow channel further surrounds the accommodating area, and an area of the cooling liquid flow channel corresponding to the accommodating area is formed by a good heat conductor.

* * * * *